United States Patent
Allard, III et al.

(10) Patent No.: US 10,082,805 B2
(45) Date of Patent: Sep. 25, 2018

(54) REMOVABLE TIME ADJUSTING DEVICE, SYSTEM, AND METHOD FOR ADJUSTING AN ELECTRONIC PLUMBING CONTROLLER

(71) Applicant: SDB IP Holdings, LLC, Oviedo, FL (US)

(72) Inventors: Rock R. Allard, III, Oviedo, FL (US); Blaine Anderson, Maitland, FL (US); Robert M. Cannon, Jr., Orlando, FL (US)

(73) Assignee: SDB IP Holdings, LLC, Oviedo, FL (US)

( * ) Notice: Subject to any disclaimer, the term of this patent is extended or adjusted under 35 U.S.C. 154(b) by 784 days.

(21) Appl. No.: 14/309,246

(22) Filed: Jun. 19, 2014

(65) Prior Publication Data

US 2014/0379145 A1 Dec. 25, 2014

Related U.S. Application Data

(60) Provisional application No. 61/837,864, filed on Jun. 21, 2013.

(51) Int. Cl.
| | |
|---|---|
| *G05D 7/00* | (2006.01) |
| *G05D 7/06* | (2006.01) |
| *E03B 7/07* | (2006.01) |
| *G05B 19/042* | (2006.01) |

(52) U.S. Cl.
CPC ........... *G05D 7/0617* (2013.01); *E03B 7/071* (2013.01); *G05B 19/0426* (2013.01); *G05B 2219/2605* (2013.01)

(58) Field of Classification Search
CPC .............. G05D 7/0617; G05B 19/0426; G05B 2219/2605; E03B 7/071
See application file for complete search history.

(56) References Cited

U.S. PATENT DOCUMENTS

| | | | |
|---|---|---|---|
| 6,038,519 A * | 3/2000 | Gauthier | E03C 1/05 307/18 |
| 6,195,588 B1 * | 2/2001 | Gauthier | E03C 1/05 700/11 |
| 6,337,635 B1 | 1/2002 | Ericksen et al. | |
| 6,402,048 B1 * | 6/2002 | Collins | B05B 3/02 239/210 |
| 2002/0002425 A1 * | 1/2002 | Dossey | G01F 1/44 700/284 |
| 2002/0148515 A1 | 10/2002 | Coffey et al. | |

(Continued)

FOREIGN PATENT DOCUMENTS

| | | |
|---|---|---|
| JP | 2000236761 A | 9/2000 |
| KR | 20120083101 A | 7/2012 |
| WO | 8605945 A1 | 10/1986 |

*Primary Examiner* — Christopher E Everett
(74) *Attorney, Agent, or Firm* — The Webb Law Firm

(57) ABSTRACT

A system, device, and method for adjusting temporal settings of an electronic plumbing controller are provided. A removable time adjustment device includes at least one input device, at least one interface configured to communicate with the electronic plumbing controller, and at least one controller configured to set or adjust, on the electronic plumbing controller through the at least one interface, at least one temporal setting for the at least one plumbing fixture based at least partially on user input from the at least one input device.

20 Claims, 5 Drawing Sheets

(56) References Cited

U.S. PATENT DOCUMENTS

| | | | |
|---|---|---|---|
| 2008/0103636 A1* | 5/2008 | Glenn | G06F 19/327 700/302 |
| 2010/0263742 A1 | 10/2010 | Bogdanska | |
| 2011/0169786 A1 | 7/2011 | Freier et al. | |
| 2011/0260827 A1* | 10/2011 | Shapiro | E03B 1/04 340/3.1 |
| 2013/0123991 A1 | 5/2013 | Richmond | |
| 2014/0020166 A1* | 1/2014 | Metcalf | E03D 13/007 4/301 |
| 2015/0057765 A1* | 2/2015 | Parker | G01M 3/2815 700/12 |

\* cited by examiner

_US 10,082,805 B2_

REMOVABLE TIME ADJUSTING DEVICE, SYSTEM, AND METHOD FOR ADJUSTING AN ELECTRONIC PLUMBING CONTROLLER

CROSS REFERENCE TO RELATED APPLICATION

This application claims priority to U.S. Provisional Patent Application No. 61/837,864, filed Jun. 21, 2013, entitled "Removable Time Adjusting Device, System, and Method for Adjusting an Electronic Plumbing Controller," the entire disclosure of which is incorporated herein by reference.

BACKGROUND OF THE INVENTION

Field of the Invention

The present invention relates generally to plumbing controller adjustments and, in particular, a removable time adjustment device, system, and method for adjusting temporal settings of an electronic plumbing controller.

Description of Related Art

Typically, electronic plumbing controllers control, restrict, or regulate the amount of water used in various appliances (e.g., toilets, sinks, showers, and the like). These devices include adjustment features that allow users to adjust settings of the controllers. For example, an adjustment feature may allow a user to restrict or expand the amount of time allotted to run a shower or faucet, the number of uses of a shower or faucet allowed in a certain period of time, the number of flushes allowed in a certain period of time, and the like.

In certain institutional environments, adjustment features on electronic plumbing controllers can be taken advantage of by individuals. For example, in a penitentiary where prisoners have access to the chase that includes the plumbing fixtures and controllers for one or more appliances, there is a risk that the controllers will be tampered with. In these environments, the time allowed to run an appliance, or the number of times that an appliance can be actuated within a period of time, is often restricted to prevent excessive use of the appliances, flooding, vandalism, and other types of misuse. Thus, there is a need for a removable time adjustment device and system to allow authorized personnel to adjust temporal settings on electronic plumbing controllers.

SUMMARY OF THE INVENTION

Generally, it is an object of the present invention to provide a removable time adjustment device, system, and method for adjusting an electronic plumbing controller that overcomes some or all of the deficiencies of the prior art.

According to one preferred and non-limiting embodiment, provided is a removable time adjusting device for adjusting at least one temporal setting on an electronic plumbing controller associated with at least one plumbing fixture, comprising: at least one input device; at least one interface configured to communicate with the electronic plumbing controller; and at least one controller configured to set or adjust, on the electronic plumbing controller through the at least one interface, at least one temporal setting for the at least one plumbing fixture based at least partially on user input from the at least one input device.

According to another preferred and non-limiting embodiment, provided is a removable time adjustment system for adjusting or modifying at least one time-based setting for at least one plumbing fixture, comprising: at least one plumbing control unit comprising at least one port and at least one controller, the at least one port associated with at least one plumbing fixture, wherein the at least one controller is configured to control the at least one time-based setting of the at least one plumbing fixture; and a removable time adjusting device adapted to removably interface with the at least one plumbing control unit, the removable time adjusting device configured to adjust or set the at least one time-based setting on the at least one plumbing control unit.

According to a further preferred and non-limiting embodiment, provided is a method for adjusting a time-based setting of at least one plumbing fixture controlled by at least one plumbing control unit, the method performed with a removable time adjustment device comprising at least one controller, the method comprising the steps of receiving, from the at least one plumbing control unit, at least one of a run-time and a lockout-time for the at least one plumbing fixture; displaying, on or with at least one display device, the at least one of a run-time and a lockout-time; receiving user input comprising at least one of a new run-time and a new lockout-time; and adjusting at least one of the run-time and the lockout-time of the at least one plumbing control unit based at least partially on the at least one of a new run-time and a new lockout-time.

According to yet another preferred and non-limiting embodiment, provided is a method for adjusting a time-based setting of a plumbing control unit, the plumbing control unit in communication with a plumbing fixture, the method comprising the steps of providing a removable time adjusting device configured to removably interface with the plumbing control unit; establishing communication between the removable time adjusting device and the plumbing control unit; and adjusting, on the plumbing control unit with the removable time adjusting device, at least one of a run-time and a lockout-time for the plumbing fixture.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PREFERRED EMBODIMENTS

Figure 1:
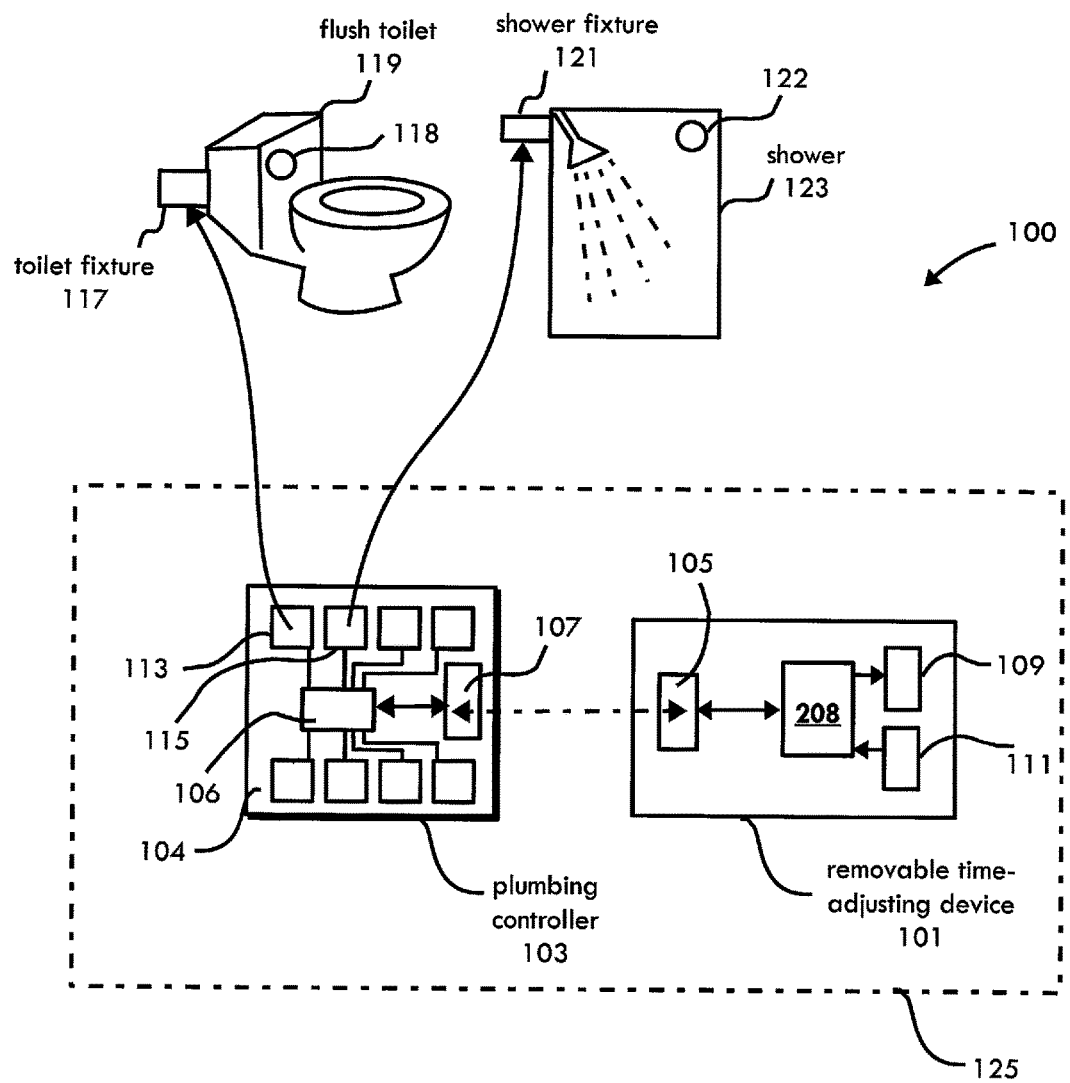
FIG. 1 illustrates a schematic diagram of one embodiment of a system for adjusting temporal settings of an electronic plumbing controller according to the principles of the present invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. It will be appreciated that numerous arrangements are possible.

In one preferred and non-limiting embodiment, provided is a system 100 for adjusting an electronic plumbing controller. The system 100 includes a removable time adjustment device, and at least one electronic plumbing controller associated with at least one plumbing fixture. The removable time adjustment device is programmed, configured, and/or adapted to communicate with the electronic plumbing controller to adjust or set a temporal setting associated with the plumbing fixture. For example, the removable time adjustment device may adjust a run-time or lockout-time for the plumbing fixture, allowing users in possession of the removable time adjustment device to select and/or adjust these features on electronic plumbing controllers.

As used herein, the terms "adjust" and "adjusting" refer to selecting, changing, modifying, updating, setting, and/or programming one or more values, settings, and/or variables associated with a plumbing fixture. Therefore, adjusting a setting may include, but is not limited to, activating a setting from a non-active state, deactivating a setting from an active state, adjusting a setting from a null value to a new value, adjusting a setting from an existing value to a new value, and/or the like. Further, the terms "temporal setting" or "time-based setting," as used herein, refer to one or more settings having an attribute relating to time including, but not limited to, a run-time, a lockout-time, an on-time, an off-time, and/or the like. A run-time may be, for example, a period of time during which a plumbing fixture is allowed to operate for discrete, individual uses. A lockout-time may be, for example, a period of time during which a fixture is made inoperable. Additionally, an on-time and an off-time may be a range of times during which a fixture is operable or inoperable. It will be appreciated that numerous other temporal settings may be used and adjusted with the system 100.

Referring now to FIG. 1, a system 100 for adjusting an electronic plumbing controller 103 is shown according to one preferred and non-limiting embodiment. The system 100 includes a removable time adjusting device 101, an electronic plumbing controller (e.g., control unit) 103, and plumbing fixtures 117, 121. In the embodiment illustrated in FIG. 1, the plumbing fixtures include a toilet fixture 117 associated with a flush toilet appliance 119, and a shower fixture 121 associated with a shower appliance 123. However, it will be appreciated that numerous other types of plumbing fixtures and/or appliances may be used with the system 100 including, but not limited to, faucets, drinking fountains, and the like. In some non-limiting embodiments, the plumbing fixtures 117, 121 are operated with a solenoid in communication with the plumbing controller 103. However, it will be appreciated that the plumbing fixtures 117, 121 may be operated in numerous other ways by means of the plumbing controller 103.

With continued reference to FIG. 1, the removable time adjusting device 101 includes an interface 105 configured or adapted to communicate with an interface 107 of the plumbing controller 103. The removable time adjusting device 101 may also include a display device 109 and at least one input device 111. The interface 105 of the removable time adjusting device 101 and the interface 107 of the plumbing controller 103 may communicate via a direct or indirect electrical connection, a wireless connection, or in various other ways. In non-limiting embodiments, the interfaces 105, 107 may include physical connection arrangements adapted to connect with each other such as, for example, plug and socket connectors, connection pins, conductive contact surfaces, and/or the like. In one example, the controller interface 107 may include a T-shaped pin-header and the device interface 105 may include a corresponding connector. Additionally, the interfaces 105, 107 may also include radio frequency (RF) interfaces or other types of wireless adapters.

In a preferred and non-limiting embodiment, the plumbing controller (e.g., control unit) 103 includes a circuit board 104 that includes or supports the interface 107, one or more input/output (I/O) ports 113, 115 to be associated with plumbing fixtures 117, 121, one or more microprocessors 106, volatile or non-volatile memory, and/or other components. The microprocessor 106 may be programmed with embedded software to implement and control one or more temporal settings for one or more of the plumbing fixtures 117, 121 associated therewith. It will be appreciated that the microprocessor 106 may also execute software stored in memory or elsewhere.

Still referring to FIG. 1, each of the appliances 119, 123 may include a trigger device 118, 122, such as a button, switch, dial, infrared (IR) sensor, proximity sensor, and/or the like, that is in communication with the controller 103. The trigger device 118, 122, when actuated, pressed, switched, selected, or otherwise triggered, causes a signal or command to be communicated to the controller 103 that causes the corresponding fixture 117, 121 to be activated or deactivated. Prior to activation of the fixture 117, 121, the microprocessor 106 may determine if the fixture 117, 121 is locked or deactivated (e.g., if a lockout-time associated with the fixture has not yet expired or if the fixture is scheduled to be in an off-state) and, if not, operates the fixture 117, 121. For some or all of the fixtures 117, 121, a run-time associated with the fixture may specify how long the fixture can be operated. For example, a shower fixture 121 may be associated with a three (3) minute run-time, allowing the shower to be operated for that time period or less.

During operation of the fixture 117, 121, the microprocessor 106 determines when the run-time has expired using an internal clock, interrupts, or by other means. After the run-time has expired, the fixture 117, 121 is turned off or deactivated and, in some embodiments, a lockout-time is initiated which prevents re-use of the fixture 117, 121 for an additional period of time. The lockout-time may also be initiated based on numerous other events or triggers such as, for example, repeated manipulation of the input device 118, 122, a signal or command received from another party or system, predetermined conditions, and the like. It will be appreciated that the plumbing controller 103 may be programmed in any number of ways and with any number of conditions to implement temporal settings for the fixtures 117, 121. For example, run-time and lockout-time settings and triggers may differ among ports 113, 115 and/or fixtures 117, 121. Additionally, the plumbing controller 103 may be pre-programmed with default settings or, in alternative embodiments, fully or partially programmed by the removable time adjusting device 101.

Figure 2:
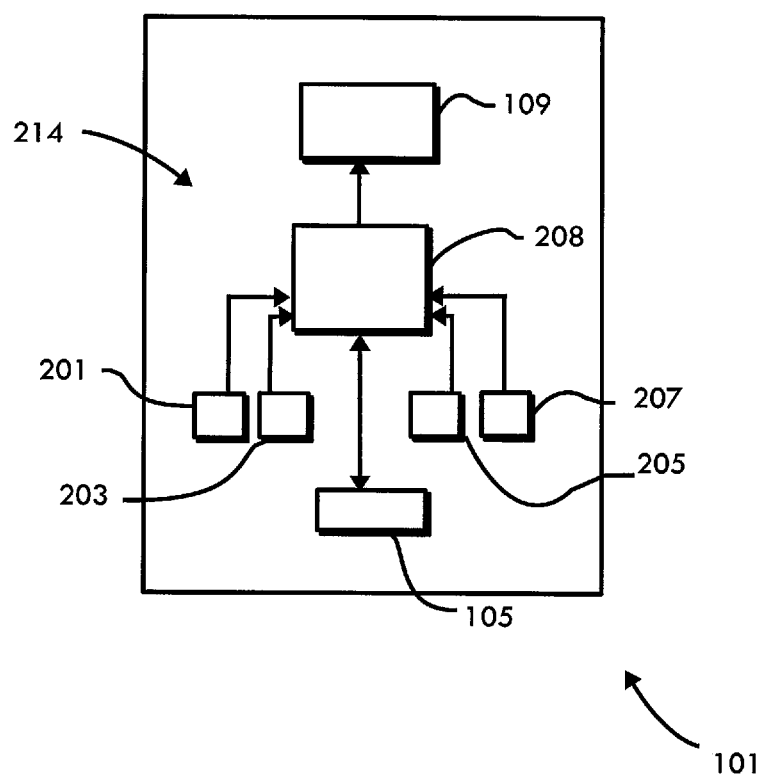
FIG. 2 illustrates a schematic diagram of one embodiment of a removable time adjusting device for adjusting temporal settings of an electronic plumbing controller according to the principles of the present invention.

Referring now to FIG. 2, a component view of a removable time adjusting device 101 is shown according to a preferred and non-limiting embodiment. A circuit board 214 includes or supports a controller or microprocessor 208, input ports or input devices 201, 203, 205, 207, an interface 105, and a display device 109. The microprocessor 208 is in communication with input devices 201, 203, 205, 207, the interface 105, and display device 109. The microprocessor 208 may be programmed with embedded software, or in communication with memory including executable software, such that it is configured to receive user input through the input devices 201, 203, 205, 207, to receive and transmit data to and from the plumbing controller 103 (not shown) through the interface 105, and to display information with the display device 109. The input devices 201, 203, 205, 207 may include, but are not limited to, buttons, potentiometers, switches, dials, touchscreens, and/or the like. The removable time adjusting device 101 may also include volatile or non-volatile memory, various other inputs, a battery or power source, and/or other components.

Figure 3:
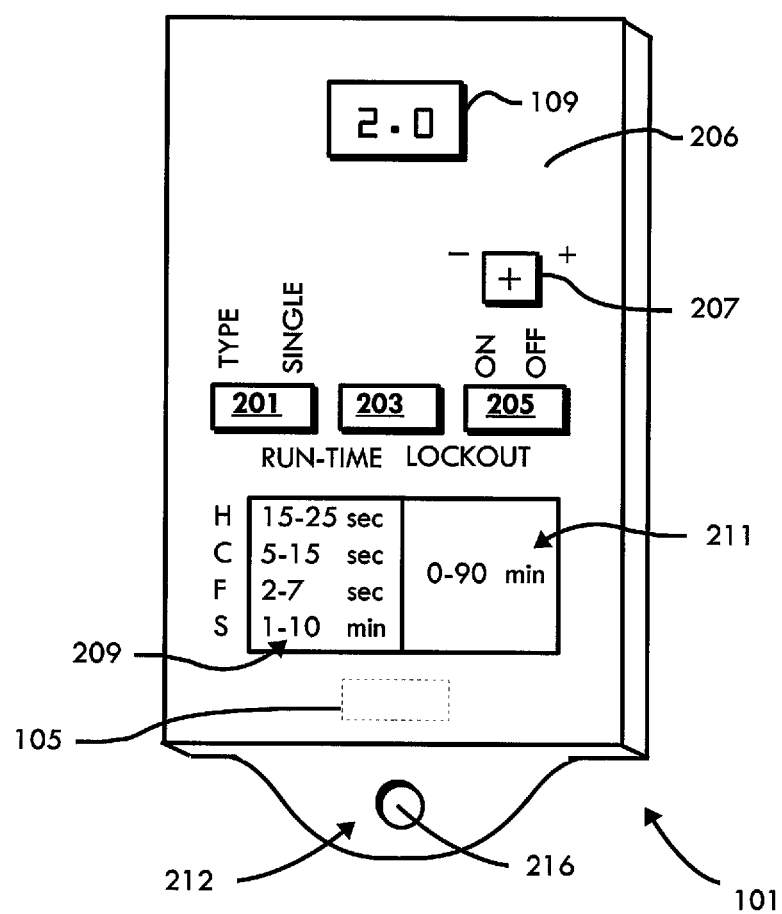
FIG. 3 illustrates an exterior view of the removable time adjusting device shown in FIG. 2 according to the principles of the present invention.

Referring now to FIG. 3, an external view of a removable time adjusting device 101 is shown according to a preferred and non-limiting embodiment. A housing 206 includes, contains, and/or otherwise supports a display device 109, input devices 201, 203, 205, 207, an interface 105, and printed indicia 209, 211 that includes instructions, ranges, and/or other information. The removable time adjusting device 101 may also include a flange 212 including an aperture 216 or other arrangement for hanging the device 101 from a lanyard or hook. The display device 109 may include a liquid crystal display (LCD), a series of light emitting diodes (LED), or other visual indictors or outputs.

With continued reference to FIG. 3, and according to a preferred and non-limiting embodiment, the input device 207 is a potentiometer and input devices 201, 203, 205 are buttons. The input devices 201, 203, 205 may be used to select various options, configurations, and/or settings, and the potentiometer input device 207 may be used to adjust a value displayed on the display device 109. It will be appreciated that various other input devices and arrangements of input devices may be used such as, for example, switches, dials, touchscreens, and/or the like. For example, in one non-limiting embodiment, the housing 206 may support a touchscreen input device that simultaneously provides an input device, a display device, and instruction information. In the non-limiting embodiment shown in FIG. 3, a centered potentiometer 207 may represent a null value or a pre-set default value, and turning the potentiometer 207 clockwise increases the value, while a counter-clockwise direction decreases the value.

However, it will be appreciated that various other arrangements are possible. With continued reference to FIG. 3, it will be appreciated that the housing 206 may comprise any material, shape, or size, and may be in numerous forms. Further, various types and arrangements and configurations of the components are possible. For example, the display device 109 may not be part of the removable time adjusting device 101 and may instead be located on the plumbing controller 103 (not shown) or elsewhere.

An input device 203 may be used to select or toggle between adjustment of the run-time and adjustment of the lockout-time, or between other temporal settings on the plumbing controller 103. In some non-limiting embodiments, a user may be prompted to make such a selection through the display device 109 before making any adjustments. Further, an input device 201 may be used to select or toggle between adjustment of a single port on the controller 103, multiple ports of the controller 103 associated with the same or similar type of fixture, all ports on the controller 103, and/or the like. Again, a user may be prompted to make this selection through the display device 109 prior to making any adjustments. For example, the display device 109 may display "Select Port" or "SP" for such a prompt. An input device 205 may also be used to turn the removable time adjusting device 101 on or off.

Figure 4:
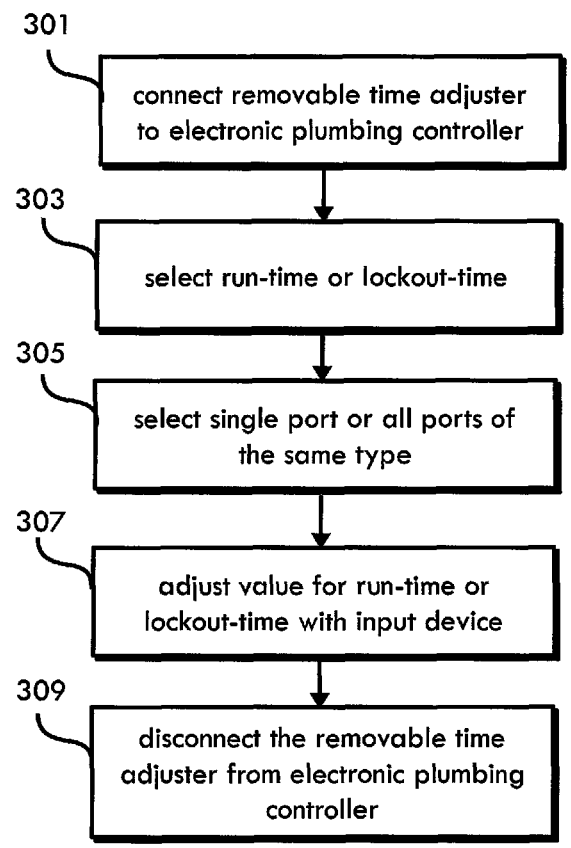
FIG. 4 illustrates a step-diagram for one embodiment of a system and method for adjusting temporal settings of an electronic plumbing controller according to the principles of the present invention.

Referring now to FIG. 4, a method for operating the removable time adjusting device 101 is shown according to a preferred and non-limiting embodiment. At an initial step 301, a user connects the device 101 to a plumbing controller 103 that is to be adjusted. At a next step 303, the user selects or toggles between adjustment of a run-time or adjustment of a lockout-time, or between other temporal settings. After making this selection, at a next step 305, the user may select the fixture to be adjusted by selecting a single port, all ports associated with the same type of fixture, all ports on the controller 103, a specific type of fixture, and/or the like. At step 307, the user adjusts the run-time or lockout-time, or some other temporal setting, by turning a potentiometer 207, or otherwise inputting or selecting an adjusted value. After the adjustments have been made, at a final step 309, the removable time adjusting device 101 is disconnected and removed from the plumbing controller 103, preventing unauthorized manipulation of the temporal settings.

Figure 5:
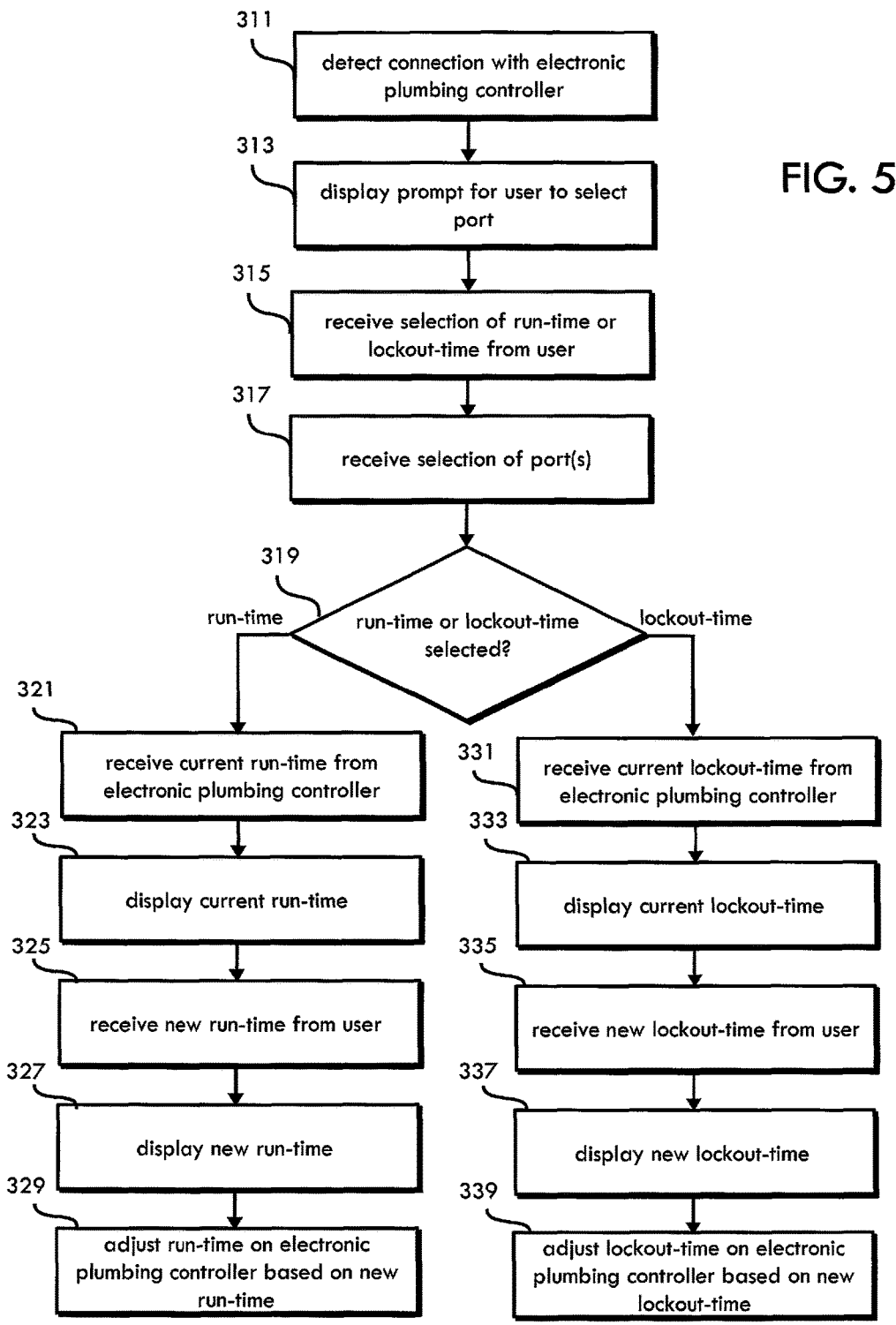
FIG. 5 illustrates a step-diagram for another embodiment of a system and method for adjusting temporal settings of an electronic plumbing controller according to the principles of the present invention.

Referring now to FIG. 5, a method for adjusting a temporal setting of a plumbing controller 103 is shown according to a preferred and non-limiting embodiment. The method shown in FIG. 5 is performed by the hardware and/or software of the removable time adjusting device 101. At an initial step 311, after the device 101 is in communication with the plumbing controller 103, the device 101 detects the connection and, at a next step 313, displays a prompt for a user to select a port or setting. The device 101 then, at step 315, receives a user selection indicating that the user would like to adjust a run-time, a lockout-time, or some other temporal setting. At a next step 317, the device 101 receives a user selection of one or more ports of the plumbing controller 103 to adjust.

With continued reference to FIG. 5, at step 319, the device 101 determines what temporal setting was selected. Although step 319 depicts a determination between a run-time and lockout-time selection, it will be appreciated that other temporal settings may also be selected. If a run-time is selected, the method proceeds to step 321 in which data representing a current run-time is received from the plumbing controller 103 and, at step 323, the current run-time is displayed by the device 101. At step 325, the device 101 receives a new run-time from the user and, at step 327, displays the new run-time. The new run-time may be displayed in real-time as the user adjusts it with an input device 207. Finally, after the user indicates that the new run-time is the desired run-time, at step 329 the device 101 communicates, to the plumbing controller, 103, data configured to adjust the run-time based on the new run-time. At step 319, if a lockout-time is selected, the method proceeds to step 331 in which data representing a current lockout-time is received from the plumbing controller. At step 333, the current lockout-time is displayed by the device 101 and, at step 335, a new lockout-time is received from a user. The new lockout-time is displayed at step 337 and data configured to adjust the lockout-time based on the new lockout-time is communicated to the plumbing controller 103 at step 339.

It will be appreciated that the temporal ranges of time-based settings may vary and, in some examples, may vary by fixture type, predefined settings, and the like. For example, in one non-limiting embodiment, the lockout-time can be set from 0-90 minutes for all fixtures, the run-time for shower fixtures can be set from 1-10 minutes, the run-time for toilet fixtures may be 2-7 seconds, the run-time for a cold faucet fixture may be 5-15 seconds, and the run-time for a hot faucet fixture may be 15-25 seconds. However, in non-limiting embodiments, the range of possibilities may be the same for all fixture types and, in some examples, the ranges may be boundless. The ranges may be initially programmed into the removable time adjusting device 101, or may be specified by an authorized party. In the non-limiting embodiment shown in FIG. 3, printed indicia 209, 211 show the ranges possible for different types of fixtures. For example, indicia 209 may indicate preferred ranges for hot water (H) (e.g., 15-25 seconds), cold water (C) (e.g., 5-15 seconds), flush (F) (e.g., 2-7 seconds), and shower (S) (e.g., 1-10 minutes) run-times. This information may also be displayed through the display device 109, and various other instructional information may be provided on the housing 206 of the device 101.

In one non-limiting embodiment, the removable time adjusting device 101 may be in the form of a multi-purpose portable device such as, for example, a smart phone, tablet computer, and/or the like. In such an embodiment, the device 101 may include executable software for communicating with the plumbing controller 103 and adjusting the temporal settings on the plumbing controller 103. The options, configurations, and/or settings may be chosen through a graphical user interface (GUI) displayed on the display device 109, which may be a touchscreen that also serves as an input device. Further, wired or wireless interfaces may be used to communicate between the multi-purpose portable device and the plumbing controller 103 such as, for example, radio frequency adapters (e.g., Bluetooth, near-field, Wi-Fi, etc.), Universal Serial Bus (USB) connections, and the like.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A removable time adjusting device for adjusting at least one temporal setting on an electronic plumbing controller associated with at least one plumbing fixture, comprising:
    a housing;
    at least one input device arranged on the housing and configured to: (i) select a fixture type of the at least one plumbing fixture from a plurality of fixture types, and (ii) select a port on the electronic plumbing controller from multiple ports on the electronic plumbing controller;
    at least one interface arranged on the housing and configured to communicate and removably interface with the electronic plumbing controller, the at least one interface comprising a physical connection arrangement configured to physically connect to and disconnect from an interface or input device on the electronic plumbing controller; and
    at least one controller supported by or contained within the housing and in communication with the at least one input device and the at least one interface, the at least one controller configured to: (i) determine a selected fixture type or selected port based on user input received through the at least one input device; (2) set or adjust, on the electronic plumbing controller through the at least one interface, at least one temporal setting for the at least one plumbing fixture based at least partially on user input from the at least one input device, the at least one temporal setting having a range of values within which the electronic plumbing controller can be set or adjusted, the range of values based on at least one of the selected fixture type and the selected port.

2. The removable time adjusting device of claim 1, wherein the at least one temporal setting comprises at least one of a run-time and a lockout-time.

3. The removable time adjusting device of claim 1, wherein the at least one input device comprises at least one of the following: a button, a potentiometer, a touchscreen, a dial, a switch, or any combination thereof.

4. The removable time adjusting device of claim 1, wherein the at least one temporal setting comprises a run-time and a lockout-time, the removable time adjusting device further comprising a selection device configured to toggle between a setting to adjust the run-time of the at least one plumbing fixture and a setting to adjust the lockout-time of the at least one plumbing fixture.

5. The removable time adjusting device of claim 1, further comprising at least one display device in communication with the at least one controller, the at least one controller configured to display, on or with the at least one display device, at least one of the following: a current run-time, a current lockout-time, a selected run-time, a selected lockout-time, setting information, a prompt, or any combination thereof.

6. The removable time adjusting device of claim 1, wherein the at least one temporal setting comprises at least one of a run-time and a lockout-time, and wherein the at least one controller is further configured to:
    display, on at least one display device and in response to a first input, at least one of a current run-time and a current lockout-time;
    display, on the at least one display device and in response to a second input, at least one of a new run-time and a new lockout-time; and receive a third input comprising a selection or adjustment of the at least one of a new run-time and a new lockout-time.

7. The removable time adjusting device of claim 6, wherein the at least one controller is further configured to adjust at least one of the run-time and the lockout-time of the electronic plumbing controller based on the at least one of a new run-time and a new lockout-time.

8. A removable time adjustment system for adjusting or modifying at least one time-based setting for at least one plumbing fixture, comprising:
  at least one plumbing control unit comprising at least one port and at least one microprocessor, the at least one port associated with at least one plumbing fixture, wherein the at least one microprocessor is configured to control the at least one time-based setting of the at least one plumbing fixture; and
  a removable time adjusting device comprising a physical connection arrangement adapted to removably interface with the at least one plumbing control unit such that the removable time adjusting device can be connected to and disconnected from the at least one plumbing control unit, the removable time adjusting device configured to adjust or set the at least one time-based setting on the at least one plumbing control unit, the removable time adjusting device comprising at least one input device configured to select a port on an electronic plumbing controller from multiple ports on the electronic plumbing controller, the at least one time-based setting having a range of values within which the at least one plumbing controller can be set or adjusted, the range of values based on the port selected with the at least one input device.

9. The removable time adjustment system of claim 8, wherein the at least one time-based setting comprises at least one of a run-time and a lockout-time for the at least one plumbing fixture.

10. The removable time adjustment system of claim 9, wherein the lockout-time comprises a time period during which the at least one microprocessor is configured to prevent usage of the at least one plumbing fixture.

11. The removable time adjustment system of claim 10, wherein the at least one microprocessor is configured to prevent usage of the at least one plumbing fixture during the time period based at least partially on at least one of the following: a number of uses in a predetermined time period, a number of attempted uses in a predetermined time period, a request to prevent usage of the at least one plumbing fixture, or any combination thereof.

12. The removable time adjustment system of claim 8, wherein the removable time adjusting device comprises a housing at least partially including or supporting at least one input device and at least one interface.

13. The removable time adjustment system of claim 12, wherein the at least one input device is configured to adjust or set the at least one time-based setting.

14. The removable time adjustment system of claim 12, wherein the at least one input device comprises at least one of the following: a button, a potentiometer, a touchscreen, a dial, or any combination thereof.

15. The removable time adjustment system of claim 8, wherein the removable time adjusting device comprises at least one display device configured to display at least one of the following: a current run-time, a current lockout-time, a selected run-time, a selected lockout-time, settings information, or any combination thereof.

16. The removable time adjustment system of claim 8, wherein the removable time adjusting device comprises at least one input device configured to enable selection of at least one of the following: a single port of the at least one plumbing control unit, multiple ports of the at least one plumbing control unit, a plurality of ports corresponding to a type of fixture, all ports of the at least one plumbing control unit, or any combination thereof.

17. The removable time adjustment system of claim 8, wherein the removable time adjusting device comprises at least one microprocessor configured to:
  display, on at least one display device, at least one of a current run-time and a current lockout-time;
  display, on the at least one display device and in response to user input, at least one of a new run-time and a new lockout-time; and
  adjust or set the at least one of a new run-time and a new lockout-time based at least partially on user input.

18. A method for adjusting a time-based setting of at least one plumbing fixture controlled by at least one plumbing control unit, the method performed with a removable time adjustment device comprising at least one controller, the method comprising:
  receiving, from the at least one plumbing control unit, at least one of a run-time and a lockout-time for the at least one plumbing fixture;
  displaying, on or with at least one display device, the at least one of a run-time and a lockout-time;
  receiving user input comprising: (i) at least one of a new run-time and a new lockout-time, (ii) a selection of a fixture type of a plurality of fixture types, and (iii) a selection of a specific port of the at least one plumbing control unit from multiple ports of the plumbing control unit, wherein the at least one of the new run-time and the new lockout-time is selected from a range of values based on at least one of the selection of the fixture type and the selection of the specific port; and
  adjusting at least one of the run-time and the lockout-time of the at least one plumbing control unit based at least partially on the at least one of a new run-time and a new lockout-time.

19. The method of claim 18, wherein the removable time adjustment device comprises the at least one display device and at least one input device, wherein the user input is received from the at least one input device.

20. A method for adjusting a time-based setting of a plumbing control unit, the plumbing control unit in communication with a plumbing fixture, the method comprising:
  providing a removable time adjusting device configured to removably interface with the plumbing control unit using a physical connection arrangement, such that the removable time adjusting device can be connected to and disconnected from the plumbing control unit, the removable time adjusting device comprising at least one input device configured to enable selection of at least one of the following: a single port of the at least one plumbing control unit, multiple ports of the at least one plumbing control unit, a plurality of ports corresponding to a type of fixture, all ports of the at least one plumbing control unit, a fixture type of a plurality of fixture types, or any combination thereof;
  establishing communication between the removable time adjusting device and the plumbing control unit; and
  adjusting, on the plumbing control unit with the removable time adjusting device, at least one of a run-time and a lockout-time for the plumbing fixture, wherein the at least one of the new run-time and the new lockout-time is selected from a range of values based on the selection made with the at least one input device.

* * * * *

UNITED STATES PATENT AND TRADEMARK OFFICE
CERTIFICATE OF CORRECTION

PATENT NO. : 10,082,805 B2
APPLICATION NO. : 14/309246
DATED : September 25, 2018
INVENTOR(S) : Rock R. Allard, III et al.

Page 1 of 1

It is certified that error appears in the above-identified patent and that said Letters Patent is hereby corrected as shown below:

On the Title Page

Item (72) Inventors, Line 2, delete "Anderson," and insert -- Andersen, --

Signed and Sealed this
Twenty-ninth Day of January, 2019

Andrei Iancu
*Director of the United States Patent and Trademark Office*